Figure 1:
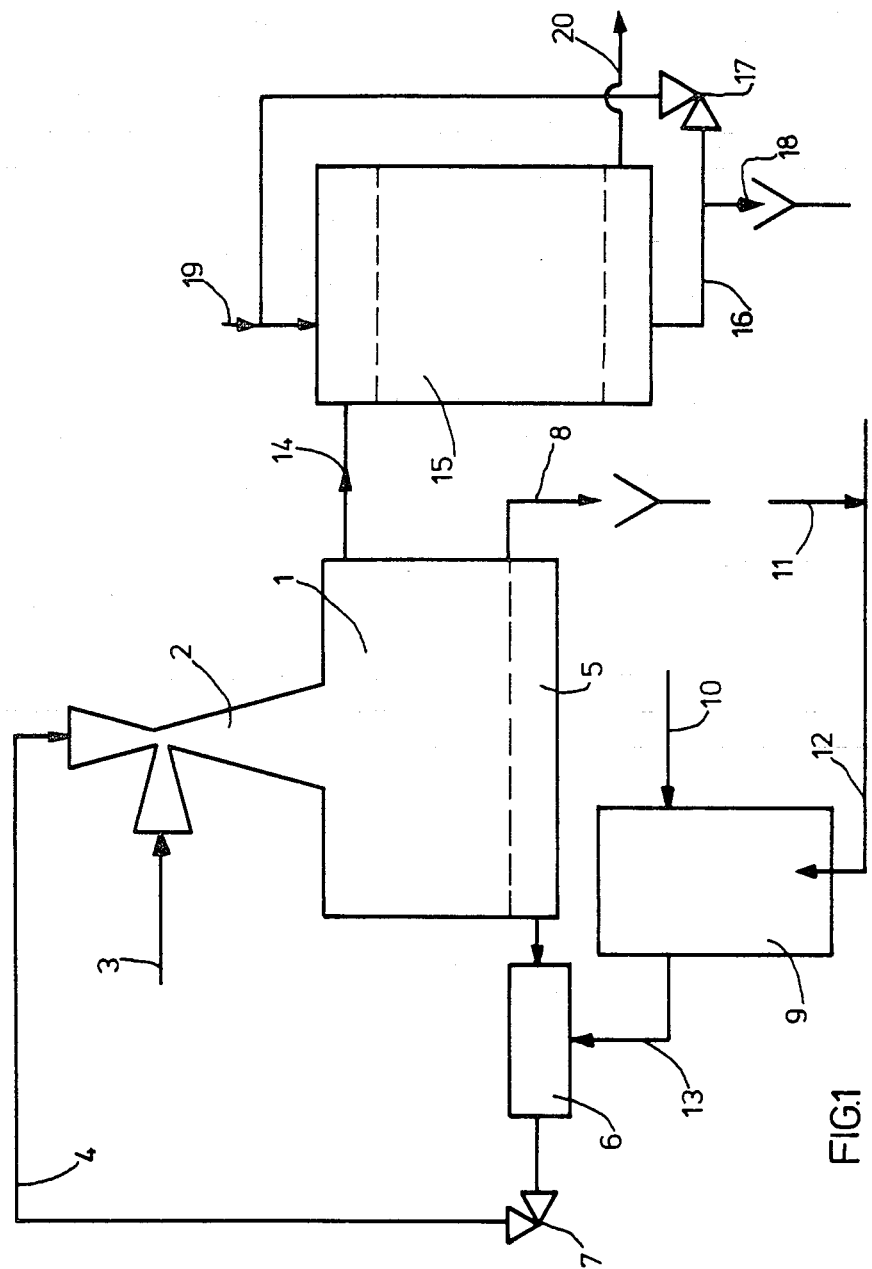

United States Patent [19]

Schmidt

[11] Patent Number: 4,544,381

[45] Date of Patent: Oct. 1, 1985

[54] PROCESS FOR REMOVAL OF EMISSION GAS POLLUTANTS BY BIOLOGICAL MEANS

[75] Inventor: Friedrich Schmidt, Wuppertal, Fed. Rep. of Germany

[73] Assignee: Bayer Aktiengesellschaft, Leverkusen, Fed. Rep. of Germany

[21] Appl. No.: 630,483

[22] Filed: Jul. 13, 1984

[30] Foreign Application Priority Data

Jul. 20, 1983 [DE] Fed. Rep. of Germany ....... 3326057

[51] Int. Cl.$^4$ .............................................. B21D 47/00
[52] U.S. Cl. .......................................... 55/89; 55/98; 55/94; 210/916; 435/266
[58] Field of Search ................... 55/84, 85, 89, 90, 91, 55/94, 223, 233; 210/916; 435/262, 266

[56] References Cited

U.S. PATENT DOCUMENTS

| | | | |
|---|---|---|---|
| 2,200,581 | 5/1940 | Pruss et al. | 435/266 |
| 3,216,905 | 11/1965 | Baptist | 435/266 |
| 3,376,219 | 4/1968 | Silvey | 435/262 X |
| 3,828,525 | 8/1974 | Copa et al. | 55/84 X |
| 4,225,381 | 9/1980 | Ishikawa et al. | 435/262 X |

FOREIGN PATENT DOCUMENTS 2643211  4/1978  Fed. Rep. of Germany ...... 435/266

Primary Examiner—Charles Hart
Attorney, Agent, or Firm—Sprung, Horn, Kramer & Woods

[57] ABSTRACT

Method for scrubbing gases containing oxygen, that are polluted by biodegradable substances, by bringing them into contact with an aqueous suspension of microorganisms such that:

(a) the period of contact between gas and suspension is 0.5–5 seconds;

(b) the suspension is brought into contact with the gas again after a retention time of 3–10 minutes has been attained;

(c) the suspension is continuously supplied with active biomass in amounts between 0.5% and 5% of the aqueous suspension whereby (d) the excess suspension is drawn off.

8 Claims, 1 Drawing Figure

PROCESS FOR REMOVAL OF EMISSION GAS POLLUTANTS BY BIOLOGICAL MEANS

The present invention relates to a method for scrubbing emission gases in which the gases that contain noxious substances and oxygen are brought into contact with an aqueous suspension of microorganisms with the result that the noxious substances are removed.

Such methods have already been described. However, the concentration of pollutants in exhaust gases is usually so low that only a low concentration of biomass can be maintained in the aqueous suspension. The known methods of this type have a capability for degradation which is limited by the low concentration of microorganisms and therefore require large volumes of aqueous microorganism suspension and a high rate of circulation in order to achieve a satisfactory removal of pollutants.

The object of the present invention is to achieve a high rate of degradation during relatively short contact periods between gas and the suspension of microorganisms which has a high concentration of microorganisms and, in relation to the volume of gas to be scrubbed, a low aqueous volume. More precisely, the present invention relates to a method for scrubbing oxygen-containing gases that are contaminated with biologically degradable substances by bringing the gases into contact with an aqueous suspension of suitable microorganisms and which is characterised by the following features:

(a) the period of contact between gas and suspension is between 0.5 seconds and 5 seconds;

(b) the suspension is brought into contact with the gas again after a retention time of between 3 minutes and 10 minutes;

(c) there is a constant feeding in of active biomass suspension in amounts lying between 0.5% and 5% of the total suspension, whereby (d) excess suspension is removed.

The continuous introduction of active biomass into the circulating suspension between the gas contact phase and the retention time phase means that it is possible to maintain a highly active biomass in the suspension that exhibits a high rate of degradation in the presence of low concentrations of pollutants, i.e. low concentrations of nutrients.

The contact between gas and liquid is achieved at a ratio of gas volume flow, under normal conditions, to fluid volume flow of between 6 and 30 whereby a large surface area for the transfer of gas into the liquid is achieved by the simultaneous generation of droplets.

The preferred apparatus for the generation of gas-fluid contact is the jet washer or the Venturi washer. The noxious substances enter into solution at the surface of the liquid droplets during the phase of contact between gas and liquid. The highly active biomass results in a continuous degradation which in turn means that a concentration gradient is maintained at the surface of the liquid and thus inhibits the formation of saturation concentrations in the boundary layer.

This especially high, short-term activity of the biomass, which is of importance during the period of contact between gas and suspension, is attained during the retention period following contact, because it is during this period that a complete degradation of pollutants is carried out while no further noxious substances are being introduced.

The suspension, which is more or less free of noxious substances, is then brought into contact with the gas again. This more or less complete degradation of pollutants during the retention period is achieved by preventing the remixing of the suspension as much as possible before it is brought into contact with the gas again.

In this respect it has been found that in general a two-phase retention period is sufficient. The concentration of biomass in the suspension is preferably 0.2–1 g dry weight per liter of suspension and in particular 0.5–0.8 g dry weight per liter.

The concentration of the active biomass which is being continuously introduced into the system is preferably 0.5–2 g dry weight per liter and in particular above 0.8 g dry weight per liter. Concentrations of 1 g dry weight per liter are generally sufficient.

The active biomass that, according to this invention, is introduced into the system is produced in a fermenter as appropriate. The fermenter is operated as an air-lift fermenter whereby the air that is introduced into the column of the fermenter contains the emission gas components at a high concentration or substances that are similar to the components of the emission gas with respect to their biodegradability. The longer period of contact between air and the aqueous suspension in the fermenter (air-lift column) means that a high concentration of biomass can be maintained with an adequate supply of nutrients.

It is usually necessary to regulate the typical biochemical parameters such as pH stabilisation, temperature stabilisation, nutrient supply and removal of metabolites. According to the invention a maintained pH of between 7 and 8 is preferred. This can be attained by addition of sodium carbonate or bicarbonate. The temperature in the fermenter and also in the suspension that comes into contact with the emission gas should be between 25° C. and 35° C., preferably about 30° C.

With the method described in this invention it has been found only sparingly degradable substances, such as aliphatic and aromatic chlorinated hydrocarbons, can be removed from emission gases by up to one third. If the system is run in two stages, in other words two scrubbing systems as described in this invention are connected in series, the level of degradation of these sparingly degradable substances is increased to 50%.

The method according to the invention has been found to be especially advantageous because it is relatively insensitive to sudden increases in levels of acid or alkaline gases. This is because the pH regulation system responds quickly. The method according to the invention is therefore particularly suitable as the first stage in a multi-stage gas scrubbing plant whereby the subsequent stage can consist of, for example, a trickle filter filled with activated charcoal. Such trickle filters by themselves are very sensitive to variations in pH and temperature. If the emission gas treatment according to the invention is put in line in front of the trickle filter, the buffer effect of this preceding wash will synergistically improve the performance of the trickle filter, especially in long term operation.

The following is a more detailed explanation of the invention illustrated in the form of an example:

FIG. 1 shows the plan of the example system:

The jet washer 1 with the jet sprays 2 is fed with emission gas via supply line 3. Pump 7 pumps the aqueous suspension of microorganisms into the jet washer via supply line 4.

The suspension of microorganisms collects on the floor 5 of the jet washer after contact with the emission gas. The second retention stage for the microorganism suspension,